May 18, 1937. R. WILLIAMS ET AL 2,080,523
ARTIFICIAL TREE
Filed March 24, 1936
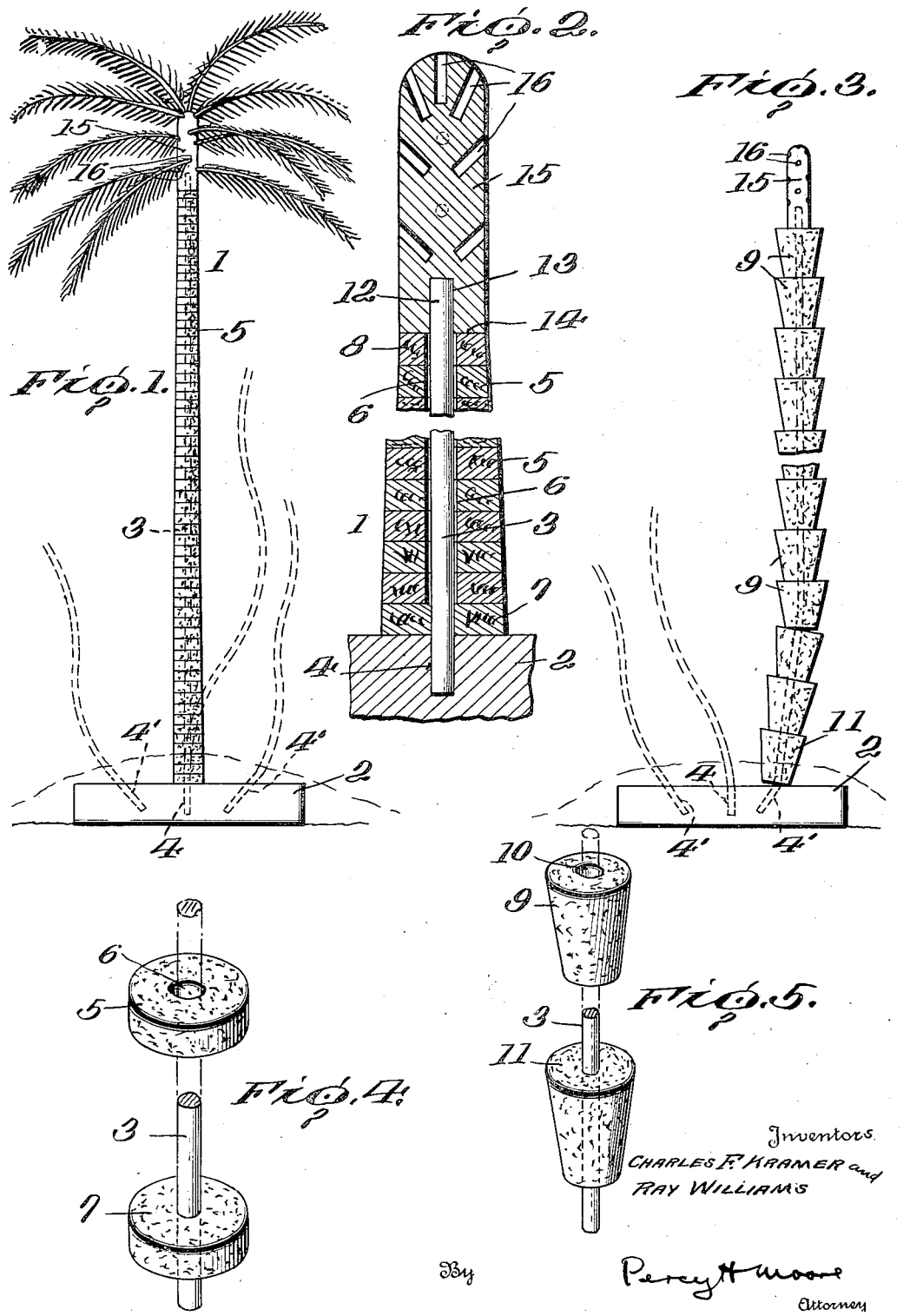

Patented May 18, 1937

2,080,523

UNITED STATES PATENT OFFICE 2,080,523

ARTIFICIAL TREE

Ray Williams and Charles F. Kramer, Jacksonville, Fla.

Application March 24, 1936, Serial No. 70,646

10 Claims. (Cl. 41—15)

The present invention relates to artificial trees simulating natural palm trees and the like adapted for numerous ornamental and display uses, and to the method of making same.

The principal object of our invention is to provide a miniature artificial palm tree in which the trunk is comprised of a plurality of cork members so arranged that the trunk can be made to assume different desired shapes or positions to closely simulate a natural palm tree.

Another object is to provide an artificial tree having a trunk comprising a plurality of corks and a removable leaf or frond holder mounted on the uppermost portion thereof.

Another object is the provision of an artificial tree comprising a flexible stem member having slidably arranged tapered corks mounted thereon whereby upon adjustment of the corks the trunk can be made to assume different positions and shapes.

A further object is to provide an artificial tree which is simple in construction, easily and readily assembled, manufactured at comparatively little cost and adapted to have a wide range of uses.

These and other objects and advantages of our invention will be apparent when the specification is considered with the accompanying drawing, in which:

Figure 1 is a side elevation of an artificial palm tree showing the preferred embodiment of our invention;

Figure 2 is an enlarged sectional detail view of the stem and cork discs forming the preferred form of palm tree trunk;

Figure 3 is a side elevation of a modified form of trunk;

Figure 4 is a perspective view of the stem and cork discs of the form illustrated in Figures 1 and 2; and Figure 5 is a perspective view of the stem and bottle corks of the form illustrated in Figure 3.

Referring more particularly to the drawing in which like reference characters designate like parts throughout the views, numeral 1 designates generally the preferred embodiment of our artificial palm tree, which is comprised of a substantially rectangular base member 2, of wood or other suitable material, and a relatively thin flexible metal wire rod or stem 3. The lower end of the stem 3 is fixedly positioned in a central aperture 4 in the base and extends upwardly therefrom to any desired heighth. In order to permit of the stem being arranged at various angles, two additional apertures 4' are formed in the base at either side of the central aperture 4, or at any other suitable position. These apertures 4' are formed at any desired angle or slope whereby upon insertion of the stem into one of these apertures the same will be caused to extend outwardly at an angle, as distinguished from the directly upright or vertical position assumed when fitted in the central aperture.

The trunk of the tree is comprised of a plurality of circular cork discs or the like 5, each having an aperture 6, extending centrally therethrough and through which the stem 3 is inserted when assembling the tree. A base or lowermost cork disc 7 is preferably fixedly positioned or fastened by any suitable means, such as wedging or the like, onto the stem adjacent the lower end thereof. In this position the cork will be flush with the top face of the base 2 when the stem is inserted thereinto, whereby the stem will be supported and prevented from tipping or becoming disengaged from the base. The other cork discs 5 are loosely or slidably arranged on the stem thus facilitating the ready assembly or disassembly of the tree.

In the preferred embodiment illustrated in Figures 1 and 2, the corks 5 are preferably gradually tapered in size from the relatively large base cork 7 to a relatively small size top cork 8 positioned on the upper end of the stem, thus producing a trunk having a comparatively even or smooth outer finish. When it is desired to construct smaller trees, from say six to thirty six inches in heighth, ordinary downwardly tapered bottle corks or the like 9, illustrated in Figures 3 and 5, each being of like size and shape, are preferably employed. However, in the latter embodiment, it is to be noted that each cork 9 is loosely arranged on the stem, except the base cork which is fixedly positioned as previously described, with its relatively small lower end 10 resting on the relatively large top face 11 of the cork positioned immediately below, whereby the trunk will have a rough or uneven finish as distinguished from the preferred embodiment.

The upper end 12 of the stem extending through and above the top cork 8, is loosely received in a central aperture 13 formed in the bottom face 14 of a solid cylindrical leaf holder or support 15, of wood or other suitable material. A plurality of staggered and spaced apertures or pockets 16 are provided in and around the outer face of the holder, the same being of different sizes to accommodate palm leaves or fronds of different sizes, which are fitted thereinto. The pockets are preferably formed at different angles or slopes whereby the palms or other leaves will be caused to extend upwardly or outwardly in different directions thus more realistically simulating a natural palm tree.

To assemble one of the palm trees described herein, the base cork 7 is suitably fastened or wedged onto the stem adjacent the lower end which is inserted into one of the apertures in the base, whereupon the tapered cork discs 5 or bottle corks 9, depending upon the size of tree being constructed, are applied to the top of the stem and slidingly moved or dropped to the lower end thereof. This step is repeated until the desired number of corks have been arranged on the stem. The cylindrical leaf holder is then placed in position on the upper end of the stem and palm leaves or the like inserted in their respective pockets.

When it is desired to change the shape or position of the tree it is only necessary to grasp the flexible trunk with the hands and bend or twist the same. The loosely mounted leaf holder and corks will thus be caused to be moved or pushed upwardly on the stem thereby permitting the trunk to assume any desired position, such as illustrated for example by the dotted lines in Figures 1 and 3, without the necessity of disassembling or removing any of the parts.

While we have shown and described a preferred embodiment and modification of our invention, it is to be understood that various changes in the size, shape and arrangement of the parts may be resorted to, without departing from the spirit of the invention or the scope of the appended claims.

Having thus described our invention, what we claim is:

1. An artificial tree or the like having a base, a trunk extending upwardly from said base, a plurality of loosely arranged disk-shaped members on said trunk, and a removable holder mounted on the upper end of said trunk for receiving leaves therein.

2. An artificial tree or the like comprising a base, a stem member extending upwardly therefrom, said member having a plurality of disc-shaped members arranged thereon, and a holder mounted on the upper end of said stem for receiving palm leaves therein.

3. An artificial tree or the like comprising a base, a stem member extending upwardly therefrom, said stem having a plurality of disc members loosely mounted thereon, and a holding member positioned on the upper end of said stem, said member having means therein for supporting leaves.

4. An artificial palm tree or the like comprising a base, a stem trunk member extending upwardly from said base comprised of a plurality of cork members, said stem trunk member having means at the upper end thereof for supporting leaves therein.

5. An artificial palm tree or the like comprising a base having a stem member thereon, said member having a plurality of cork members mounted thereon, and a removable member on the upper end of said stem having grooves therein for supporting palm leaves on said member.

6. An artificial palm tree or the like comprising a base, an upright flexible stem member on said base, said stem member having a plurality of corks loosely mounted thereon, and a removable member on the upper end of said stem for supporting palm leaves.

7. An artificial palm tree or the like comprising a base, an upright flexible metal stem member on said base, said member having a plurality of tapered corks slidably arranged on said stem, and a removable member on the upper end of said stem, said last named member having a series of staggered pockets therein for supporting palm leaves.

8. An artificial palm tree or the like comprising a base, a flexible metal stem member extending upwardly from said base, a plurality of corks having perforations therein, whereby said corks are slidably mounted on said stem, and a removable member on the upper end of said stem, said member having a series of staggered sloping pockets therein for supporting a cluster of palm leaves.

9. An artificial tree or the like comprising a base having a plurality of apertures therein, a stem member positioned in one of said apertures and extending upwardly therefrom, said stem having a plurality of cork members mounted thereon, and a removable member on the upper end of said stem for supporting leaves.

10. An artificial tree or the like comprising a base, a stem member extending upwardly therefrom, said stem member having a plurality of cork members mounted thereon, one of the cork members at the lower end of said stem being secured thereto, and a holder mounted on the upper end of said stem for supporting leaves.

RAY WILLIAMS.
CHARLES F. KRAMER.